United States Patent [19]
Diehl

[11] Patent Number: 6,062,258
[45] Date of Patent: May 16, 2000

[54] GAS PRESSURE REGULATOR HAVING BURN-OUT PROTECTION SYSTEM

[75] Inventor: Gregory William Diehl, Florence, S.C.

[73] Assignee: The Esab Group, Inc., Florence, S.C.

[21] Appl. No.: 09/097,540

[22] Filed: Jun. 15, 1998

[51] Int. Cl.[7] .......................... G05D 16/06; G05D 16/02
[52] U.S. Cl. ...................... 137/505.41; 137/505
[58] Field of Search ............................. 137/505, 505.41, 137/505.42

[56] References Cited

U.S. PATENT DOCUMENTS

| | | |
|---|---|---|
| 1,190,514 | 7/1916 | Cash . |
| 1,264,006 | 4/1918 | Bucknam . |
| 2,049,382 | 7/1936 | Deming .............................. 137/505.42 |
| 2,702,561 | 2/1955 | Geffroy ........................ 137/505.42 X |
| 2,731,975 | 1/1956 | Boals . |
| 2,768,643 | 10/1956 | Acomb . |
| 2,777,456 | 1/1957 | Ey . |
| 3,809,108 | 5/1974 | Hughes . |
| 3,911,948 | 10/1975 | Collins, Jr. et al. . |
| 4,064,890 | 12/1977 | Collins et al. . |
| 4,099,538 | 7/1978 | Curtis . |
| 4,457,329 | 7/1984 | Werley et al. . |
| 4,489,751 | 12/1984 | Acomb et al. . |
| 4,516,595 | 5/1985 | Acomb . |
| 4,679,582 | 7/1987 | Zwicker . |

FOREIGN PATENT DOCUMENTS 900 071 7/1962 United Kingdom .

*Primary Examiner*—Stephen M. Hepperle
*Attorney, Agent, or Firm*—Alston & Bird LLP

[57] ABSTRACT

A gas pressure reducing regulator which includes a flexible diaphragm which is biased by a spring so as to control the opening of the valve of the regulator and thus the delivery pressure of the gas being regulated. The regulator includes a system for effectively containing an accidental oxygen fire, or the like, within the body of the regulator, and protecting the internal components from ignition. The system includes a plunger which resides in an axial bore in the regulator body and shields the diaphragm from hot combustion products, and plunger-retaining features which prevent the plunger from being displaced from its axial bore. Also, the regulator has provision for venting the interior of the regulator to the atmosphere in the event of an excessive overpressure therein.

25 Claims, 2 Drawing Sheets

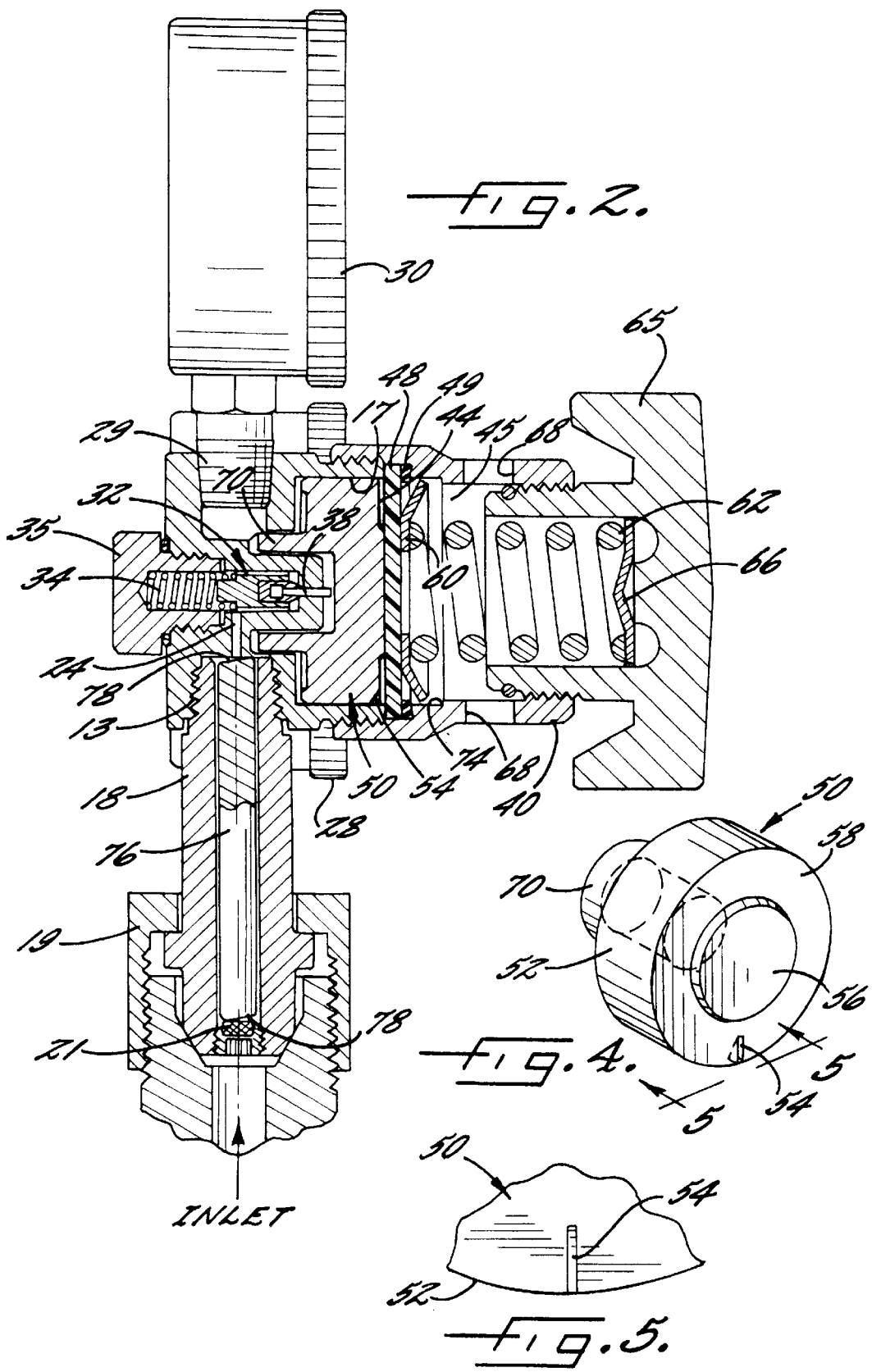

GAS PRESSURE REGULATOR HAVING BURN-OUT PROTECTION SYSTEM

FIELD OF THE INVENTION

The present invention relates to a compressed gas regulator of the type which may be attached to a compressed gas cylinder so as to regulate the flow of the gas therefrom.

BACKGROUND OF THE INVENTION

A regulator of the described type is disclosed in U.S. Pat. No. 2,768,643, and includes a casing which mounts a valve positioned between inlet and outlet gas passages, and a diaphragm clamped within the casing so as to be movable to adjust the size of the opening of the valve. The movement of the diaphragm, and thus the pressure of the gas being discharged, are controlled by a manually adjustable screw, which controls the loading of a spring which engages the diaphragm.

U.S. Pat. No. 4,516,595 issued to Acomb discloses a similar regulator which includes a plunger positioned to isolate the diaphragm from the valve seat in response to a spontaneous ignition or overpressure within the regulator body upstream of the diaphragm. By immediately closing off the diaphragm chamber, the plunger essentially prevents ignition of the diaphragm, purportedly substantially reducing the potential for a sustained combustion within the regulator. The plunger is retained by a separate threaded member which is screwed onto the valve body.

An improvement in the type of regulator disclosed by Acomb is described in pending patent application Ser. No. 08/585,802 filed on Jan. 16, 1996, now U.S. Pat. No. 5,711,340 issued to Gusky et al., commonly owned with the present application, and entitled "Gas Pressure Reducing Regulator", the entire disclosure of which is incorporated herein by reference. The regulator includes a back-up plate which overlies one side of the flexible diaphragm, and a spring which engages the back-up plate so as to bias the diaphragm assembly in a direction to tend to open the valve to allow gas flow to the outlet of the regulator. The back-up plate includes a vent opening extending axially therethrough, and the closure cap which contains the spring and back-up plate includes a vent for venting the inside of the cap to the atmosphere. Thus, in the event of an overpressure in the chamber below the diaphragm resulting for example from ignition of the gas passing through the regulator and such overpressure reaches the flexible diaphragm, the flexible diaphragm is able to rupture and release the pressure through the vent opening in the back-up plate and then through the vent in the closure cap so that the pressure is released to the atmosphere. The regulator also includes a plunger for isolating the diaphragm from the valve seat, the plunger being retained by a threaded plunger-retaining member which is screwed into the valve body.

While the regulator described in the Gusky patent provides protection against regulator burn-out, there is still room to further improve this aspect of the regulator's performance. Additionally, the inclusion of the plunger-retaining member complicates the design of the valve body and requires additional manufacturing and assembly operations.

SUMMARY OF THE INVENTION

The present invention was developed to improve upon the regulator burn-out protecting features of the regulator described in the Gusky patent, and to simplify construction of the regulator. To these ends, the invention provides a gas pressure reducing regulator which comprises a valve body having an inlet passage, an outlet passage, and a valve chamber interconnecting the inlet passage and the outlet passage. The valve body further includes an axial bore extending along an axial direction from adjacent the valve chamber to an open end of the bore at an outer face of the valve body, and an aperture which connects the valve chamber to the axial bore and the outlet passage. A valve assembly is positioned in the valve chamber so as to permit controlled gas flow between the inlet and outlet passages and the valve assembly is mounted for limited movement in an axial direction between a closed position closing the aperture and an open position wherein the aperture is open. The valve assembly also includes a valve pin extending axially through the aperture into the axial bore.

A flexible diaphragm closes the open end of the axial bore so as to define a closed gas chamber in the bore. A plunger is mounted in the axial bore for axial movement therein, the plunger having an outer peripheral surface which fits closely within the axial bore so as to restrict gas flow from the axial bore to the diaphragm such that the plunger forms a physical barrier between the diaphragm and the valve chamber. A spring assembly contacts the side of the diaphragm opposite the plunger and is operable to apply a biasing force to the diaphragm in a direction tending to urge the plunger against the valve pin so as to urge the valve assembly toward the open position.

A cup-shaped cap which contains the spring assembly is mounted to the valve body so as to retain the spring assembly in operable engagement with the diaphragm, the cap including a plunger-retaining surface intruding into the path of movement of the plunger to limit the extent to which the plunger is able to move away from the valve chamber such that at least a portion of the outer peripheral surface of the plunger remains closely engaged in the axial bore.

In the event of an overpressure within the valve body resulting for example from ignition of the gas passing through the regulator and such overpressure reaches the flexible diaphragm and damages the diaphragm and/or other components within the cap so as to tend to allow the plunger to move into the cap, the plunger-retaining surface in the cap prevents the plunger from coming out of the bore. Thus, the plunger continues to provide its barrier function preventing unrestricted flow of gas into the cap region. The invention thereby eliminates the separate plunger-retaining member which is required with the regulator described in the aforementioned Acomb and Gusky patents.

In accordance with a preferred embodiment of the invention, the regulator includes other features which also serve to retain the plunger in the axial bore, and which may be used instead of or in addition to the cap and plunger configuration described above. More particularly, the spring assembly includes a diaphragm plate in facewise contact with the side of the diaphragm opposite the plunger, and a compression spring having one end engaging the diaphragm plate for applying the biasing force to the diaphragm. The diaphragm plate has an outer periphery which is greater in diameter than a minimum diameter of the plunger-retaining surface. Thus, the diaphragm plate and plunger-retaining surface coact to limit the extent to which the plunger is able to move away from the valve chamber.

In accordance with still another preferred embodiment of the invention, an annular slip ring is disposed in facewise engagement with an outer peripheral portion of the diaphragm on the side opposite the plunger. The cap has an end face which clamps the slip ring and the outer peripheral portion of the diaphragm against the valve body. The slip ring has an inner periphery of smaller diameter than the outer peripheral surface of the plunger, whereby the slip ring serves to limit movement of the plunger away from the valve chamber.

A further aspect of the invention provides a regulator in which the valve chamber and the axial bore are separated by a wall in which is formed an axially extending generally annular recess. The plunger has a tubular skirt depending from the end of the plunger that faces the valve chamber, and the skirt extends into and closely fits in the annular recess. Accordingly, gas flowing through the open aperture into the axial bore can reach the diaphragm only by flowing between the skirt and the inner walls of the annular recess, and then past the outer peripheral surface of the plunger to the diaphragm. The skirt thus lengthens the flow path for the gas to travel, so that in the event of an internal ignition, the hot gases must travel a long flow path before reaching the diaphragm, and accordingly the gases are cooled to a level making it substantially less likely that the diaphragm can ignite.

Contaminants such as grease, oil, or other materials present at the inlet of a regulator can be ignited under some circumstances, such as when the regulator is rapidly pressurized. Ignited particles entering the inlet can then cause a chain reaction, leading to ignition of internal parts of the regulator. The invention in one preferred embodiment addresses this problem by providing a regulator which includes an inlet connector tube connected with the valve body and having a gas passage therein for supplying gas into the inlet passage of the valve body. An inlet baffle is disposed in the gas passage for slowing and dissipating energy of the gas flowing to the regulator inlet passage and to quench ignited particles. The inlet baffle preferably comprises a solid cylindrical member slightly smaller in diameter than the gas passage and having planar end faces that are non-perpendicular to the longitudinal axis of the member. The baffle is inserted into the gas passage with one of the angled end faces abutting an outer surface of the valve body where the inlet connector tube connects thereto. The opposite end of the inlet connector tube includes a filter disposed in the open end of the gas passage, and the other angled end of the baffle is abutted by the filter to retain the baffle in a generally fixed axial position in the gas passage. Gas flowing through the inlet connector tube must flow around the baffle between the outer surface thereof and the inner surface of the gas passage, and this tends to dissipate some of the energy in the flow and quench any ignited particles flowing through the inlet connector tube so that the probability of ignited particles reaching the valve assembly and causing a chain reaction is reduced. The baffle also tends to mitigate a rapid pressurization of the regulator so that there is less chance of particles igniting in the first place.

The invention thus provides a gas pressure regulator having a unique plunger and plunger-retaining features such that the plunger forms a barrier or shield for the diaphragm and related components and such that the plunger cannot readily be displaced from the axial bore in the valve body in which it resides. The invention also provides a regulator having unique features for dissipating gas flow energy. Additionally, the invention simplifies construction of a regulator by eliminating the separate plunger-retaining member required in certain prior regulators.

BRIEF DESCRIPTION OF THE DRAWINGS

Some of the objects and advantages of the present invention having been stated, others will appear as the description proceeds, when considered in conjunction with the accompanying drawings, in which:

FIG. 2 is a sectional view of the regulator taken substantially along the line 2—2 of FIG. 1;

FIG. 4 is a fragmentary, somewhat enlarged top elevational view of the plunger depicting the slot in the end face in greater detail; and FIG. 5 is a fragmentary end view of the plunger as viewed along line 5—5 of FIG. 4.

DETAILED DESCRIPTION OF THE PREFERRED EMBODIMENTS

Figure 1:
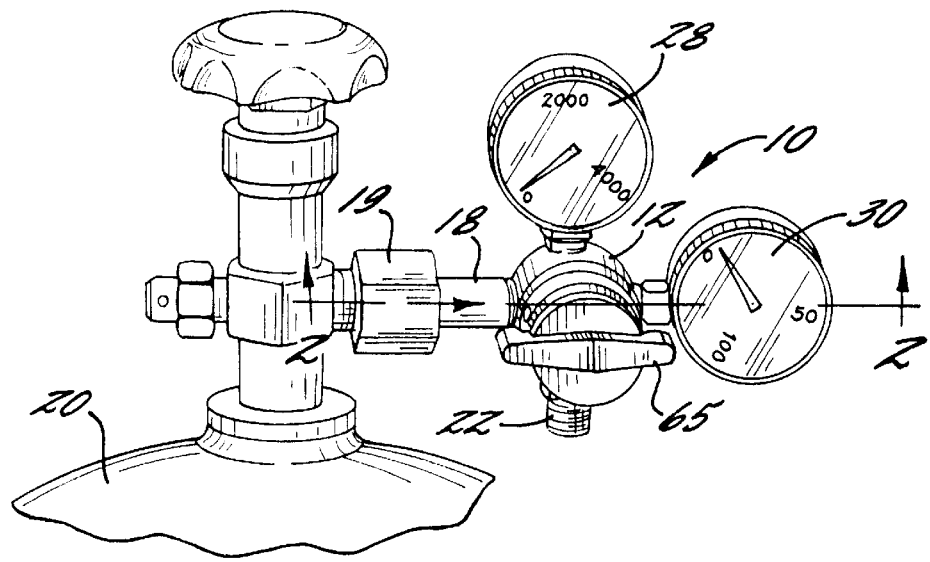
FIG. 1 is a perspective view of a gas pressure reducing regulator which embodies the present invention, and attached to a conventional gas cylinder.
Figure 3:
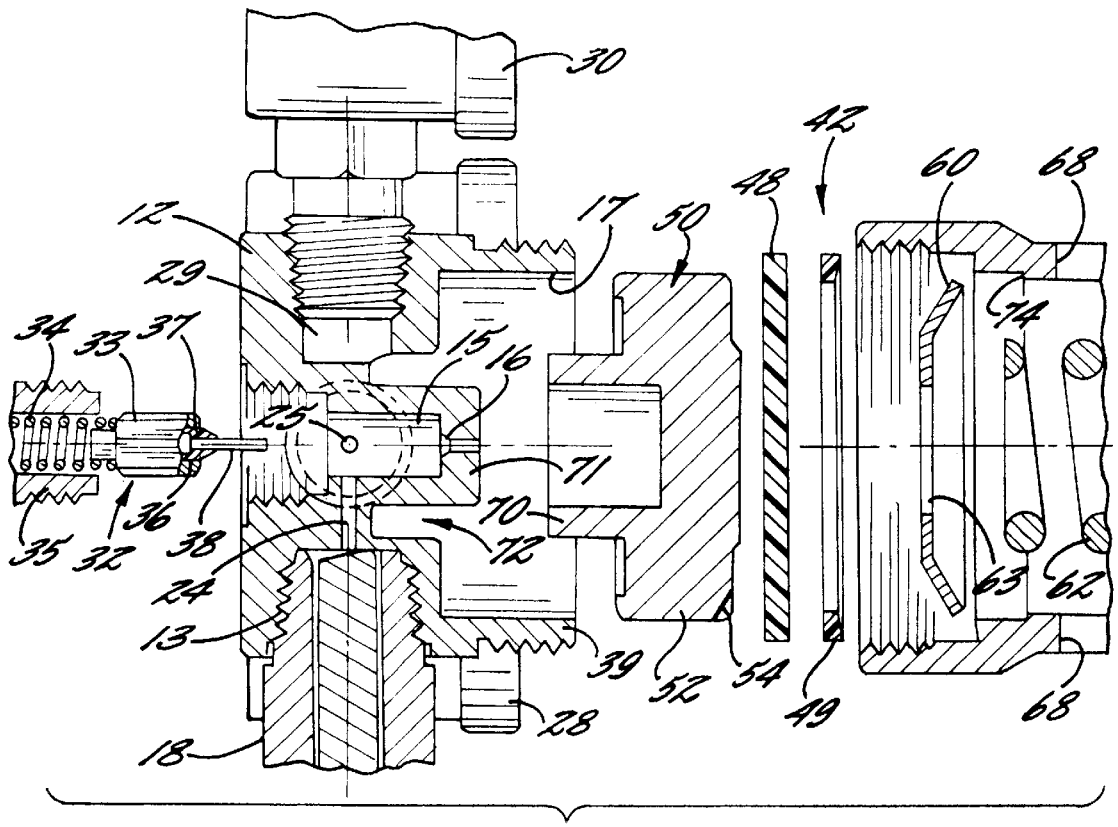
FIG. 3 is a perspective view of a plunger in accordance with the invention.

Referring more particularly to the drawings, FIGS. 1–3 illustrate a preferred embodiment of a regulator 10 in accordance with the present invention. The regulator is similar in many respects to the regulator described in the aforementioned Gusky patent, particularly as regards the overall layout of the regulator inlet and outlet passages and pressure gauges. Accordingly, description of the common features of the regulators is somewhat abbreviated herein, inasmuch as the Gusky patent describes these features in detail.

The regulator 10 comprises a valve body 12 which is typically fabricated from a copper alloy, and which has an inlet passage 13, an outlet passage (not shown, but extending generally out of the paper in FIGS. 2 and 3), and a valve chamber 15 interconnecting the inlet passage and the outlet passage. The inner end of the valve chamber 15 defines a valve seat 16 (FIG. 3). An inlet connector tube 18 is threadedly fixed in the inlet passage 13, and the inlet connector tube 18 mounts a threaded coupling 19 for securing the tube to the output line of a conventional gas cylinder, such as an oxygen cylinder 20 (FIG. 1). A conventional filter 21 may be positioned in the inlet connector tube, if desired. Also, an outlet connector tube 22 is threadedly fixed in the outlet passage (not shown), with the outlet connector tube 22 being adapted for connection to the equipment being serviced by the regulator.

The inlet passage 13 includes a small diameter bore 24 which is drilled into the valve body at the inner end of the inlet passage, and extends radially into the valve chamber 15. The small size of the bore 24 acts to slow and absorb some of the energy of the incoming gas before it reaches the valve seat 16. A second radial bore 25 (FIG. 3) extends from the valve chamber 15 and communicates with a threaded passage (not shown) which is adapted to mount a high pressure gauge 28 (FIG. 1), so that the pressure in the inlet passage can be readily determined by the operator.

A further threaded passage 29 communicates with the outlet passage and is adapted to mount a low pressure gauge 30, so that the outlet pressure can also be readily observed.

A valve slider 32 is positioned in the valve chamber 15 so as to permit controlled gas flow between the inlet and outlet passages. The valve slider 32 comprises a cylindrical metal body 33 having flutes on the exterior surface, and it is mounted for limited movement in an axial direction between a closed position closing the valve seat 16 as seen in FIG. 2, and an open position wherein the valve seat is open.

To bias the valve slider 32 toward its closed position, there is provided a valve closing helical spring 34 which is mounted in a cavity in a housing 35, which is threadedly joined to the valve body 12. The spring 34 is preferably made of a metal alloy which is highly resistant to ignition in the event of an oxygen fire in the inlet passage, such as the nickel alloy sold under the trademark Inconel Alloy 750 by Inco Alloys International of Huntington, W. Va.

The cylindrical body 33 of the valve slider 32 includes a cavity 36 in the end thereof adjacent the valve seat 16, with the cavity being filled with an elastomeric material 37, such as a thermoplastic polyurethane. The elastomeric material 37 in turn mounts a valve pin 38 which extends axially through an aperture in the valve seat 16. The portion of the elastomeric material surrounding the pin 38 is of a conical configuration, and extends axially beyond the end of the body 33 of the slider 32, so as to sealably engage the valve seat 16 when the valve slider is pushed in a valve closing direction by the valve closing spring 34.

The valve body 12 also includes an axial bore 17 which extends from adjacent the valve seat 16 along the axial direction of movement of the slider 32 to an open end of the bore 17 at an outer face 39 of the valve body 12. The axial bore 17 is in fluid communication with the valve chamber 15 via the aperture in the valve seat 16, such that when the slider 32 moves to open the valve seat 16, gas is supplied through the aperture into the axial bore 17.

A cap 40 is threadedly mounted to the valve body 12 at the outer face 39 so as to define a chamber on the outlet passage side of the valve seat, a portion of the chamber being defined by the axial bore 17. A diaphragm assembly 42 is mounted in the chamber for limited axial movement and so as to engage the valve pin 38 and axially divide the chamber into a lower chamber region 44 on the side of the diaphragm assembly which faces the valve chamber 15, and an upper chamber region 45 on the other side of the diaphragm assembly. The lower chamber region 44 is defined by the axial bore 17. As shown in FIG. 2, the valve pin 38 extends through the aperture in the valve seat 16 into the lower chamber region 44. The lower chamber region 44 is in direct communication with the outlet passage and with the threaded passage 29 leading to the gauge 30.

The diaphragm assembly 42 includes a flexible elastomeric diaphragm 48 which is clampingly secured between the valve body 12 and the cap 40. The diaphragm 48 typically comprises a sheet of neoprene rubber having a thickness of about 0.07 inches. Also, the diaphragm assembly includes a brass slip ring 49 positioned between the diaphragm 48 and a shoulder on the cap 40, and a plunger 50 which is mounted in the axial bore 17 for axial movement therein. The plunger 50 comprises a generally solid cylindrical metal body having an outer peripheral surface 52 which is sized to closely fit within the axial bore 17. A gas flow path is established between the outer surface of the plunger 50 and the inner surface of the axial bore 17 so that gas can reach and act on the diaphragm 48, as further described below. The plunger 50 prevents unrestrained gas flow to the diaphragm, and acts as a shield for the diaphragm, as explained below.

A spring biasing means is provided for selectively biasing the diaphragm assembly 42 and the valve slider 32 in a direction against the force of the valve closing spring 34, so as to cause the valve slider 32 to move a controlled distance away from the closed position and thereby open the valve seat 16. The spring biasing means includes a metal diaphragm plate 60 overlying the side of the flexible diaphragm 48 which faces the upper chamber region 45, and a helical spring 62 mounted in the upper chamber region 45 so as to engage the diaphragm plate 60 and thereby bias the diaphragm assembly 42 toward the valve slider 32. The diaphragm plate 60 has a circular periphery and includes a vent opening 63 extending axially therethrough, and with the vent opening being disposed centrally in the plate. In one specific embodiment, the diameter of the vent opening 63 is about one-third the diameter of the diaphragm plate. The spring biasing means further comprises a pressure adjusting screw 65 which is threadedly mounted to the cap 40 so as to engage a spring plate 66, with the plate 66 in turn engaging the end of the spring 62 which is opposite the diaphragm plate 60.

The cap 40 further includes a pair of vent openings 68 which vent the upper chamber region 45 to the atmosphere, for the purposes described below.

In normal operation, the pressure adjusting screw 65 is initially unthreaded to release the pressure of the spring 62 on the diaphragm assembly 42. The valve seat 16 is thus closed by reason of the force exerted on the valve slider 32 by the spring 34. The valve on the gas cylinder 20 is then opened, to permit the gas to flow into the regulator via the connector tube 18. The gas will be stopped at the valve seat 16, until the pressure adjusting screw 65 is advanced so as to withdraw the valve slider 32 from the seat 16 a controlled distance. The advance of the pressure adjusting screw 65 is continued until the desired delivery pressure is reached, as indicated by the low pressure gauge 30.

When the flow of a gas such as oxygen is being regulated, there is an inherent risk that the gas might cause ignition within the regulator if proper safety procedures are not followed. If ignition occurs, the internal components most likely to ignite are the valve closing spring 34 and the elastomeric material 37 of the slider valve 32. As previously noted, the valve closing spring 34 is made from Inconel alloy rather than the usual carbon steel, so as reduce the likelihood of ignition, and the amount of the elastomeric material 37 is kept to a minimum to reduce the kindling energy available to raise the temperature to a level sufficient to ignite the copper alloy of the valve body 12. When the elastomeric material 37 burns away, the valve pin 38 drops to the bottom of the cavity in the end of the valve slider 32, which allows the valve slider 32, aided by the valve closing spring 34, to move against and substantially close the valve seat 16. This action halts the progress of the ignition, allowing the products of combustion, carbon dioxide and water, to extinguish the fire. Any gas pressure build-up due to the short duration combustion is trapped in the lower chamber region 44, because the plunger 50 acts as a physical barrier and a check valve by virtue of its close fit in the axial bore 17. Thus, hot gases are substantially prevented from entering the area between the plunger 50 and the flexible diaphragm 48.

The present invention provides a unique plunger 50 which lengthens the flow path between the valve chamber and the diaphragm 48, so that in the event of an ignition occuring in the valve chamber, a greater amount of heat and energy is dissipated, thereby reducing the probability of gases reaching the diaphragm which are hot enough to cause ignition of the diaphragm. The invention also provides unique features for retaining the plunger 50 within the axial bore 17. More specifically, the plunger 50 includes a tubular skirt 70 depending from the end of the plunger adjacent the valve seat 16. The valve body 12 includes a wall 71 which separates the valve chamber 15 from the axial bore 17. An axially extending annular recess 72 is formed in the wall 71 surrounding the valve chamber 15, and the skirt 70 extends downwardly into the annular recess 72 so that the skirt closely fits therein. Thus, gas that flows through the valve seat 16 into the axial bore 17 can reach the diaphragm 48 only by flowing between the inner surface of the recess 72 and the inner surface of the skirt 70, around the free end of the skirt, then between the outer surface of the skirt and the outer surface of the recess 72, and then between the outer peripheral surface 52 of the plunger and the inner surface of the bore 17. This long serpentine flow path aids in dissipating heat and energy so that any gaseous products of combustion will tend to be cooled by the time they reach the diaphragm, making it less likely for the diaphragm to be ignited.

To further protect the flexible diaphragm 48 from ignition, a protective thin metal plate (not shown) may be positioned between the flexible diaphragm and the plunger, with the protective plate having an opening aligned with the vent opening 63 in the diaphragm plate 60.

The outer edge of the plunger 50 can sometimes have a tendency to establish a seal against the diaphragm 48, thereby preventing gas from reaching and acting upon the inner portion of the diaphragm. This can be a problem in that the diaphragm 48 and diaphragm plate 60 are designed to allow the diaphragm to burst in the event of overpressure so as to relieve the excess pressure through the hole in the diaphragm plate and the vent holes in the cap, as further explained below. Thus, in order to allow gas to reach the inner portion of the diaphragm, the plunger 50 includes a slot 54, best seen in FIGS. 4 and 5, cut into the corner of the plunger to provide a gas flow passage from the outer peripheral surface 52 to the end face of the plunger. The slot 54 extends from a point on the outer peripheral surface 52 adjacent the end of the plunger which is against the diaphragm 48, and at an oblique angle radially inward to the upper surface of the plunger adjacent the diaphragm. The plunger 50 preferably has a generally circular center portion 56 on the end face which contacts the diaphragm 48, and a generally annular outer portion 58 which surrounds the circular center portion 56. The outer portion 58 is relieved or axially depressed such that a planar diaphragm in facewise contact with the center portion 56 does not contact the outer portion 58. The plunger thus facilitates the creation of an axial space between the diaphragm 48 and the relieved outer portion 58. The slot 54 extends into the relieved outer portion 58 of the plunger. Accordingly, gas flowing between the outer peripheral surface 52 of the plunger and the inner surface of the axial bore 17 can flow through the slot 54 into the axial space between the relieved portion 58 of the plunger and the diaphragm 48, thereby allowing gases to reach the diaphragm. Further, if an overpressure occurs in the valve chamber and the plunger 50 seals around the diaphragm, the only route available for gases to reach the diaphragm is through the slot 54. This severly limits the flow of gas available to the diaphragm and thus limits the severity of any reaction.

The unique plunger-retaining features of the invention include the slip ring 49, which has an inner diameter that is smaller than the diameter of the outer peripheral surface 52 of the plunger 50. Thus, the plunger is prevented from moving past the slip ring 49 into the cap 40 and thereby exiting the axial bore 17.

The cap 40 also includes an inwardly projecting plunger-retaining surface, preferably in the form of an annular shoulder 74, whose inner diameter is smaller than the outer diameter of the plunger 50. The shoulder 74 is axially spaced from the valve seat 16 by a sufficiently small distance that in the unlikely event that the slip ring 49 should fail to stop the movement of the plunger into the cap, the shoulder 74 will stop the plunger before it entirely exits the axial bore 17. By thus retaining at least a portion of the outer peripheral surface 52 of the plunger closely within the axial bore 17, the shoulder 74 assures that the barrier function of the plunger will not be lost.

As a further means of retaining the plunger in the axial bore, the diaphragm plate 60 has an outer periphery that is greater in diameter than the inner diameter of the shoulder 74. Thus, even before the plunger 50 can come into contact with the shoulder 74, the diaphragm plate 60 will impede the movement of the plunger and keep it disposed within the axial bore 17.

In the event of an overpressurization occuring in the valve chamber, the flexible diaphragm 48 is able to rupture and release the pressure through the vent opening 63 in the diaphragm plate 60. The gas then vents through the openings 68 in the cap 40, so that the pressure is released to the atmosphere. Stated in other words, when overpressure is sensed in the area between the plunger 50 and the diaphragm 48, the diaphragm 48 lifts off the plunger 50 and, at a predetermined pressure, ruptures and safely vents the overpressure through the openings 68 in the cap 40.

The invention also provides a means in the inlet connector tube 18 for slowing and dissipating energy of gas flow before it reaches the valve seat 16. Thus, a solid cylindrical baffle 76 is longitudinally disposed in the cylindrical gas passage of the inlet connector tube 18, closely fitting therein such that gas flows through the tube via a relatively small space between the outer surface of the baffle 76 and the inner surface of the gas passage. For example, the inner diameter of the connector tube is advantageously about 0.006–0.015 inch larger than the outer diameter of the baffle. The baffle 76 advantageously abuts the filter 21 at one end, and the other end of the baffle abuts the valve body 12 adjacent the inlet bore 24. To prevent the ends of the baffle from establishing seals with the abutting surfaces which might restrict gas flow to a greater extent than desired, the planar ends 78 are cut at an angle so that they are non-perpendicular to the longitudinal axis of the baffle.

From the foregoing description of a preferred embodiment of the invention, it will be appreciated that the invention provides a gas pressure regulator having a unique plunger and plunger-retaining features such that the plunger forms a barrier or shield for the diaphragm and related components and such that the plunger cannot readily be displaced from the axial bore in the valve body in which it resides. The invention also provides a regulator having unique features for dissipating gas flow energy.

In the drawings and the specification, there has been set forth preferred embodiments of the invention and, although specific terms are employed, the terms are used in a generic and descriptive sense only and not for purpose of limitation, the scope of the invention being set forth in the following claims.

What is claimed is:

1. A gas pressure regulator comprising:

a valve body having an inlet passage, an outlet passage, a valve chamber interconnecting the inlet and outlet passages, an axial bore extending along an axial direction from adjacent the valve chamber to an open end of the bore at an outer face of the valve body, and an aperture connecting the valve chamber to the outlet passage and the axial bore;

a valve assembly axially movable within the valve chamber between a closed position closing the aperture and an open position wherein the aperture is open to permit gas flow to the outlet passage and the axial bore, the valve assembly being biased toward the closed position and including a valve pin extending axially through the aperture into the axial bore;

a flexible diaphragm mounted to the valve body to sealingly close the open end of the axial bore;

a plunger mounted in the axial bore for axial movement therein, the plunger comprising a solid generally cylindrical body having an outer peripheral surface defining an outer perimeter, the outer peripheral surface fitting closely within the axial bore about substantially the entire outer perimeter thereof;

a spring assembly contacting the side of the diaphragm opposite the plunger and operable to apply a biasing force to the diaphragm to urge the plunger against the valve pin so as to urge the valve assembly toward the open position; and a cup-shaped cap mounted to the valve body so as to retain the spring assembly in operable, engagement with the diaphragm, the cap including a plunger-retaining surface intruding into the path of movement of the plunger to limit the extent to which the plunger is able to move away from the valve chamber;

the plunger and cap being configured such that at least a portion of the outer peripheral surface of the plunger remains closely engaged in the axial bore when the plunger is in contact with the plunger-retaining surface.

2. The gas pressure regulator of claim 1, wherein the axial bore and the outer peripheral surface of the plunger are circular in cross section and are concentric about an axis, wherein the cap has a generally cylindrical inner surface surrounding the spring assembly and coaxial with said axis, and wherein the plunger-retaining surface comprises a shoulder which extends generally radially inwardly from the inner surface of the cap.

3. The gas pressure regulator of claim 2, wherein the spring assembly comprises a diaphragm plate in facewise contact with the diaphragm, and a compression spring having one end engaging the diaphragm plate for applying the biasing force to the diaphragm, the diaphragm plate having an outer periphery of greater diameter than a minimum diameter of the shoulder in the cap, whereby the diaphragm plate and shoulder coact to further limit movement of the plunger away from the valve chamber.

4. The gas pressure regulator of claim 2, further comprising an annular slip ring in facewise engagement with an outer peripheral portion of the side of the diaphragm opposite the plunger, the cap including an end face which clamps the slip ring and the outer peripheral portion of the diaphragm against the valve body, the slip ring having an inner periphery of smaller diameter than the outer peripheral surface of the plunger, whereby the slip ring serves to limit movement of the plunger away from the valve chamber.

5. The gas pressure regulator of claim 4, wherein the outer peripheral portion of the diaphragm is clamped between the slip ring and the outer face of the valve body surrounding the open end of the axial bore.

6. The gas pressure regulator of claim 1, wherein the valve chamber and the axial bore are separated by a wall having an axially extending generally annular recess formed therein, and wherein the plunger includes a skirt depending from the end of the plunger facing the valve chamber, the skirt fitting closely within the recess, whereby the skirt lengthens the flow path which must be followed by gas flowing through the aperture and past the plunger to the diaphragm.

7. The gas pressure regulator of claim 1, further comprising an inlet connector tube connected with the valve body and having a gas passage therein for supplying gas into the inlet passage, the inlet connector tube including a baffle in the gas passage for slowing and absorbing some of the energy of the gas flowing therein before the gas reaches the valve chamber.

8. The gas pressure regulator of claim 7, wherein the gas passage in the inlet connector tube is cylindrical, and the baffle comprises a solid cylindrical member of slightly smaller diameter than the gas passage, the baffle being generally coaxially disposed in the gas passage and having opposite end faces which are planar and non-perpendicular to the longitudinal axis of the baffle.

9. The gas pressure regulator of claim 1 wherein the cap is threadedly connected to the valve body so as to permit the removal of the cap, and wherein the flexible diaphragm is clampingly secured between the valve body and the cap.

10. The gas pressure regulator of claim 9 wherein the spring assembly comprises a diaphragm plate in contact with the side of the diaphragm opposite the plunger, a compression spring having one end engaging the diaphragm plate, and a pressure adjusting screw threadedly mounted to the cap so as to engage the other end of the compression spring.

11. The gas pressure regulator of claim 1, wherein the plunger includes a generally planar end face at least a portion of which is in contact with the diaphragm, and wherein a slot is formed in the plunger end face for facilitating gas flow to the diaphragm.

12. A gas pressure regulator comprising:

a valve body having an inlet passage, an outlet passage, a valve chamber interconnecting the inlet and outlet passages, an axial bore extending along an axial direction from adjacent the valve chamber to an open end of the bore at an outer face of the valve body, and an aperture connecting the valve chamber to the outlet passage and the axial bore;

a valve assembly axially movable within the valve chamber between a closed position closing the aperture and an open position wherein the aperture is open to permit gas flow to the outlet passage and the axial bore, the valve assembly being biased toward the closed position and including a valve pin extending axially through the aperture into the axial bore;

a flexible diaphragm mounted to the valve body to sealingly close the open end of the axial bore;

a plunger mounted in the axial bore for axial movement therein, the plunger having an outer peripheral surface which fits closely within the axial bore;

a spring assembly including a diaphragm plate in facewise contact with the side of the diaphragm opposite the plunger, and a compression spring having one end engaging the diaphragm plate for applying a biasing force to the diaphragm in a direction tending to urge the plunger against the valve pin so as to urge the valve assembly toward the open position;

a cup-shaped cap which contains the spring assembly and is mounted to the valve body so as to retain the spring assembly in operable engagement with the diaphragm; and an annular slip ring in facewise engagement with an outer peripheral portion of the diaphragm, the cap including an end face and the slip ring being retained between said end face and the diaphragm, the slip ring having an inner periphery of smaller diameter than the outer peripheral surface of the plunger, whereby the slip ring serves to limit movement of the plunger away from the valve chamber.

13. The gas pressure regulator of claim 12, wherein the cap includes an inwardly projecting retaining surface having a minimum diameter less than a diameter of the outer peripheral surface of the plunger, and the retaining surface is axially spaced from the outer face of the valve body by a distance such that when the plunger abuts the retaining surface a portion of the plunger remains closely engaged in the axial core of the valve body.

14. The gas pressure regulator of claim 12, wherein the valve chamber and the axial bore are separated by a wall having an axially extending generally annular recess formed therein, and wherein the plunger includes a skirt depending from the end of the plunger facing the valve chamber, the skirt fitting closely in the recess, whereby the skirt lengthens the flow path which must be followed by gas flowing through the aperture and past the plunger to the diaphragm.

15. A gas pressure regulator comprising:
   a valve body having an inlet passage, an outlet passage, a valve chamber interconnecting the inlet and outlet passages, an axial bore extending along an axial direction from adjacent the valve chamber to an open end of the bore at an outer face of the valve body, and an aperture connecting the valve chamber to the outlet passage and the axial bore;
   a valve assembly axially movable within the valve chamber between a closed position closing the aperture and an open position wherein the aperture is open to permit gas flow to the outlet passage and the axial bore, the valve assembly being biased toward the closed position and including a valve pin extending axially through the aperture into the axial bore;
   a flexible diaphragm mounted to the valve body to sealingly close the open end of the axial bore;
   a plunger mounted in the axial bore for axial movement therein, the plunger having an outer peripheral surface which fits closely within the axial bore; and
   a spring assembly contacting the side of the diaphragm opposite the plunger and operable to apply a biasing force to the diaphragm to urge the plunger against the valve pin so as to urge the valve assembly toward the open position;
   the plunger having an end face which is at least partially planar and which opposes the diaphragm, and a slot formed in the end face of the plunger for facilitating gas flow past the plunger to the diaphragm.

16. The gas pressure regulator of claim 15, wherein the plunger comprises a cylindrical portion adjacent the diaphragm, the cylindrical portion having an axial length extending from one end face proximate the diaphragm to an opposite end face, and the slot extending from said one end face of the cylindrical portion to said opposite end face thereof.

17. The gas pressure regulator of claim 16, wherein the slot extends to the outer peripheral surface of the plunger.

18. The gas pressure regulator of claim 17, wherein the end face of the plunger proximate the diaphragm includes a central circular portion in contact with the diaphragm and an outer annular portion which is relieved such that there is an axial space between the diaphragm and the outer annular portion, the slot being formed in the outer annular portion of the plunger end face.

19. A gas pressure regulator comprising:
   a valve body having an inlet passage, an outlet passage, a valve chamber interconnecting the inlet and outlet passages, an axial bore extending along an axial direction from adjacent the valve chamber to an open end of the bore at an outer face of the valve body, and an aperture connecting the valve chamber to the outlet passage and the axial bore;
   a valve assembly axially movable within the valve chamber between a closed position closing the aperture and an open position wherein the aperture is open to permit gas flow to the outlet passage and the axial bore, the valve assembly being biased toward the closed position and including a valve pin extending axially through the aperture into the axial bore;
   a flexible diaphragm mounted to the valve body to sealingly close the open end of the axial bore;
   a plunger mounted in the axial bore for axial movement therein, the plunger having an outer peripheral surface which fits closely within the axial bore;
   a spring assembly including a diaphragm plate in facewise contact with the side of the diaphragm opposite the plunger, and a compression spring having one end engaging the diaphragm plate for applying a biasing force to the diaphragm in a direction tending to urge the plunger against the valve pin so as to urge the valve assembly toward the open position;
   a cup-shaped cap which contains the spring assembly and is mounted to the valve body so as to retain the spring assembly in operable engagement with the diaphragm; and
   an annular slip ring in facewise engagement with an outer peripheral portion of the diaphragm, the slip ring having an inner periphery of smaller diameter than the outer peripheral surface of the plunger, whereby the slip ring serves to limit movement of the plunger away from the valve chamber.

20. The gas pressure regulator of claim 19, wherein the cap includes an inner surface having a plunger-retaining surface projecting inwardly therefrom, the plunger-retaining surface intruding into the path of movement of the plunger so as to limit the extent to which the plunger can move away from the valve chamber.

21. The gas pressure regulator of claim 20, wherein the slip ring is located between the diaphragm and the plunger-retaining surface.

22. The gas pressure regulator of claim 21, wherein the plunger peripheral surface comprises a circular cylindrical surface, and the plunger-retaining surface comprises an annular shoulder having an inner diameter less than the diameter of the plunger peripheral surface.

23. A plunger for a gas pressure regulator, comprising:
   a solid cylindrical body having a first end adapted to engage a flexible diaphragm of the regulator and a second end adapted to engage a movable valve assembly of the regulator, the second end including a tubular skirt projecting therefrom, the skirt having a maximum outer diameter less than a maximum outer diameter of the plunger, with a longitudinal axis of the skirt being parallel to the longitudinal axis of the cylindrical body, whereby the cylindrical body is adapted to closely fit in an axial bore within a valve body of the regulator and the skirt is adapted to closely fit in a generally annular recess within the valve body.

24. A plunger for a gas pressure regulator, comprising:
   a generally cylindrical body having a first end and a second end and a generally cylindrical outer surface extending therebetween, wherein the first end of the plunger defines a generally flat diaphragm-engaging surface for opposing a diaphragm of a regulator, and wherein the plunger includes a slot formed in the diaphragm-engaging surface and extending to the outer cylindrical surface of the plunger, the slot providing a gas flow path between the outer cylindrical surface and the diaphragm-engaging surface, the plunger further including a tubular skirt depending from the second end of the cylindrical body for engaging an annular recess in a valve body of a regulator.

25. The plunger of claim 24, wherein the diaphragm-engaging surface includes a generally circular center portion and a generally annular outer portion surrounding the center portion and axially depressed therebelow, whereby a planar diaphragm in facewise contact with the center portion does not contact the outer portion.

* * * * *